Nov. 10, 1959   R. VENCILL   2,912,226
DRILLING MACHINE
Filed March 12, 1958   3 Sheets-Sheet 1

Roy Vencill
INVENTOR.

Roy Vencill
INVENTOR.

United States Patent Office 2,912,226
Patented Nov. 10, 1959

2,912,226

DRILLING MACHINE

Roy Vencill, Paintsville, Ky.

Application March 12, 1958, Serial No. 721,026

4 Claims. (Cl. 255—13)

The present invention generally relates to a drilling machine of a portable nature which is provided with a reciprocating drilling tool which is particularly adapted for drilling bores in the ground surface such as when boring a well.

Present day drilling machines for this purpose normally have the drill tools connected directly to a power motor by belts and transmission gears. Thus, in order to reciprocate the drill tool, the motor has to first lift the drill tool up and then let the drill tool down. Accordingly, the above invention incorporates a construction which drills with the motor only lifting the drill tool from the bottom center to the top center and then turns the drill tool loose from the motor so that the drill tool will drop downwardly to bottom center much quicker than if the drill tool were connected to the motor thus providing a more efficient drilling operation which will drill more holes in a given time since the amount of hole drilled depends upon the number of strokes of the drilling tools per minute. In the presently available devices, the highest number of strokes per minute is 56 while the machine constituting the above invention will provide up to 132 strokes per minute thus increasing the drilling rate and increasing the efficiency of the drilling operation.

A further important feature of the present invention incorporates a convertible arrangement so that the strokes of the drilling tools may be slowed down to facilitate a fishing job such as may become necessary if a drilling tool or the like becomes misplaced in the well bore.

Other objects of the present invention will reside in its simplicity of construction, ease of operation, adaptation for its particular purposes and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
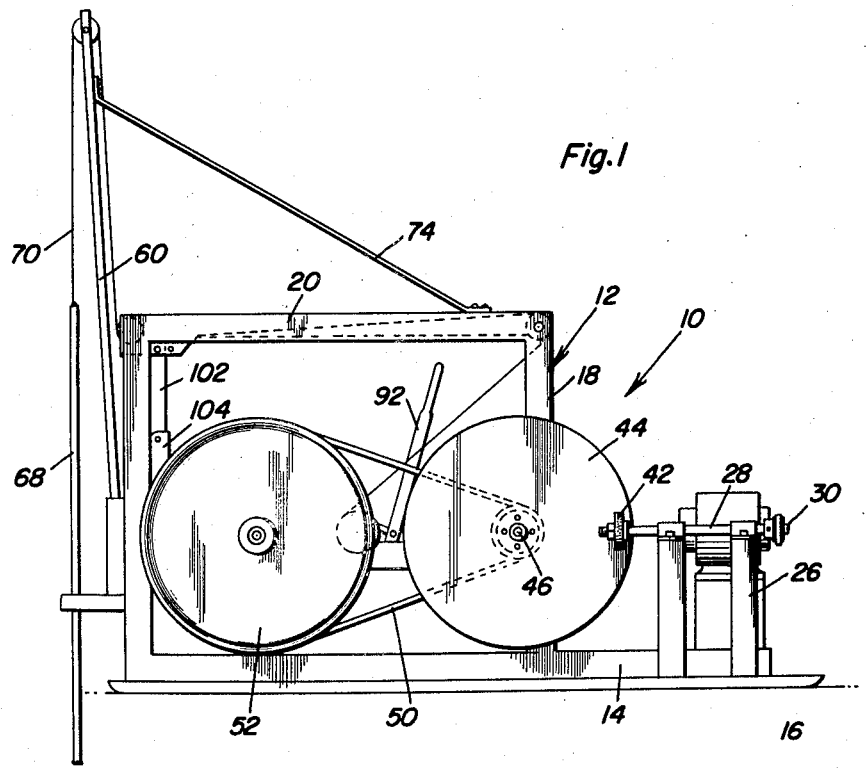
Figure 1 is a side elevation of the drilling machine.

Referring now specifically to the drawings now, the numeral 10 generally designates the drilling machine of the present invention which incorporates a supporting frame generally designated by numeral 12. The supported frame 12 includes a pair of bottom longitudinal members 14 which may be mounted on skid 16 or the like. Upstanding from the longitudinal members 14 are corner members 18 with one set of corner members 18 being spaced inwardly from the ends of the longitudinal members 14. The corner members 18 are interconnected by top longitudinal members 20 and the corner members 18 are interconnected by transverse brace members 22 all of which represents a supporting frame construction which may also include a pair of longitudinal intermediate members 24.

Mounted rearwardly of one set of corner members 18 is a pair of upstanding brackets 26 which journal a power shaft 28 therein with the power shaft having a V-belt pulley 30 on one end thereof for alignment with a V-belt pulley 32 on the power shaft 34 of an electric motor 36 with the pulleys 30 and 32 being connected by a V-belt 38. The electric motor 36 is mounted on a support plate 40 also which is supported from the longitudinal frame members 14. The other end of the shaft 28 is provided with a removable friction drive wheel 42 in engagement with the flat surface of an enlarged circular plate 44. The circular plate 44 is mounted on one end of the transverse shaft 46 supported in bearings 48 mounted on the longitudinal members 24. Thus, power is transmitted from the motor 36 through the V-belt pulley 38 to the longitudinally extending power shaft 28 through the friction drive mechanism 42 and 44 and thus to a transverse shaft 46. The transverse shaft 46 is provided with a V-belt pulley 48 thereon immediately inwardly of the plate 44 and the V-belt pulley is extremely small in relation to the plate 44. The V-belt 50 encircles the V-belt pulley 48 and also encircles an enlarged V-belt pulley 52 mounted on a transverse shaft 54 in spaced parallel relation to the transverse shaft 46 with the shaft also being supported by suitable bearings similar to the bearings 48. The V-belt pulley 52 is extremely large in relation to the V-belt pulley 48 thus providing a reduction in speed for the transverse shaft 54.

Disposed centrally on the transverse shaft 54 is a pair of spaced mounting plates 56 which are interconnected by a pair of pins 58 which are disposed at diametrically disposed points in relation to the periphery of the plates 56 and which extend therebetween. The pins 58 are 180° from each other and are disposed adjacent the periphery of the plates 56.

Figure 2:
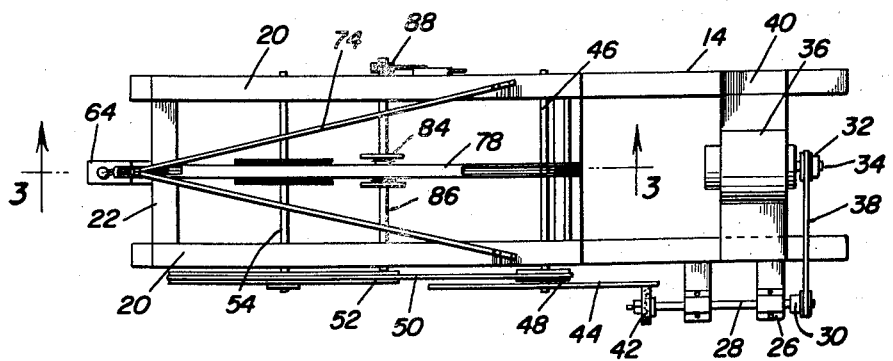
Figure 2 is a plan view of the construction of Figure 1.

Mounted forwardly on the supporting frame 12 is a vertically extending mast 60 supported in a socket 62 which is disposed on the frame immediately above the forwardly projecting guide 64 having an aperture 66 thereon for guiding reciprocation of the drill tool 68. The upper end of the drill tool 68 is attached to a drill cable 70 which extends over a crown pulley 72 at the upper end of a mast 60. The mast 60 is also supported by converging brace members 74 which extend from the mast 60 to the tops of the longitudinal frame members 20 respectively as illustrated in Figure 2. The drilling cable 70 then extends around a front beam pulley 76 mounted on an elongated drilling beam 78 of inverted channel-shaped construction. The drilling beam 78 is pivotally mounted on a shaft 80 at the rear upper corner of the frame 12 with the shaft 80 also carrying a heel beam pulley 82 over which the drilling cable 70 passes. The drilling cable 70 is wound upon a winch drum 84 supported on a transverse shaft 86 mounted on the longitudinal frame member 24. The outer end of the shaft 86 is provided with a ratchet gear 88 having a releasable pivotal operating dog 90 engageable therewith and the dog 90 is carried by an elongated operating handle 92 having one end thereof pivotally secured to the longitudinal frame member 24 as indicated by pivot pin 94. A conventional releasably holding dog, not shown, for the ratchet gear 88 may be provided, for instance as shown in U.S. Patent 2,815,929. Thus, by rocking movement of the elongated operating handle 92, the drilling cable 70 may be wound upon the drum 84 or when the dog 19 and the holding dog are released may unwind from the drum thus adjusting the top and bottom limits of movement of the drilling tool 68.

Figure 3:
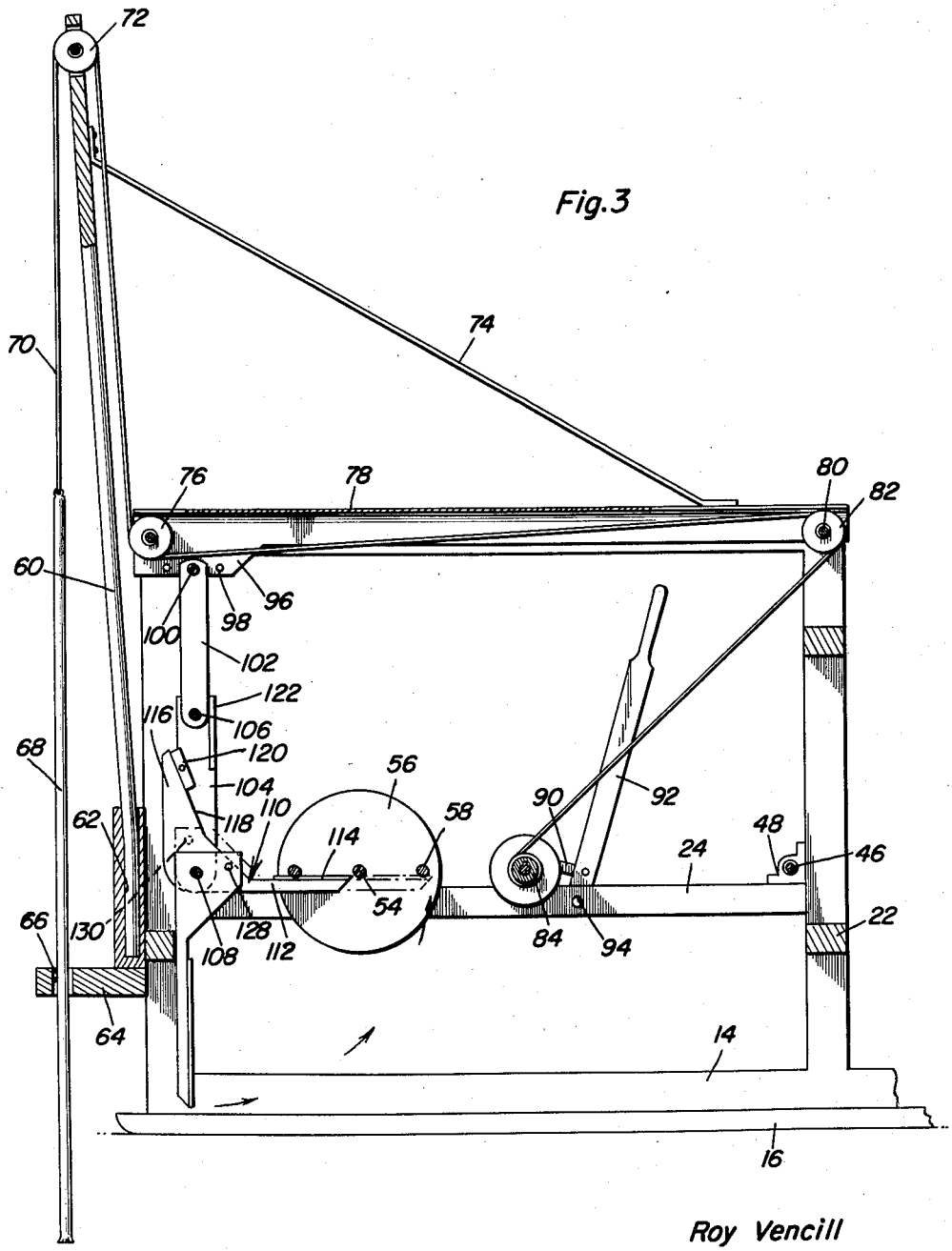
Figure 3 is a sectional view taken substantially upon the plane passing along section line 3—3 of Figure 2 illustrating the details of construction of the drilling machine.
Figure 4:
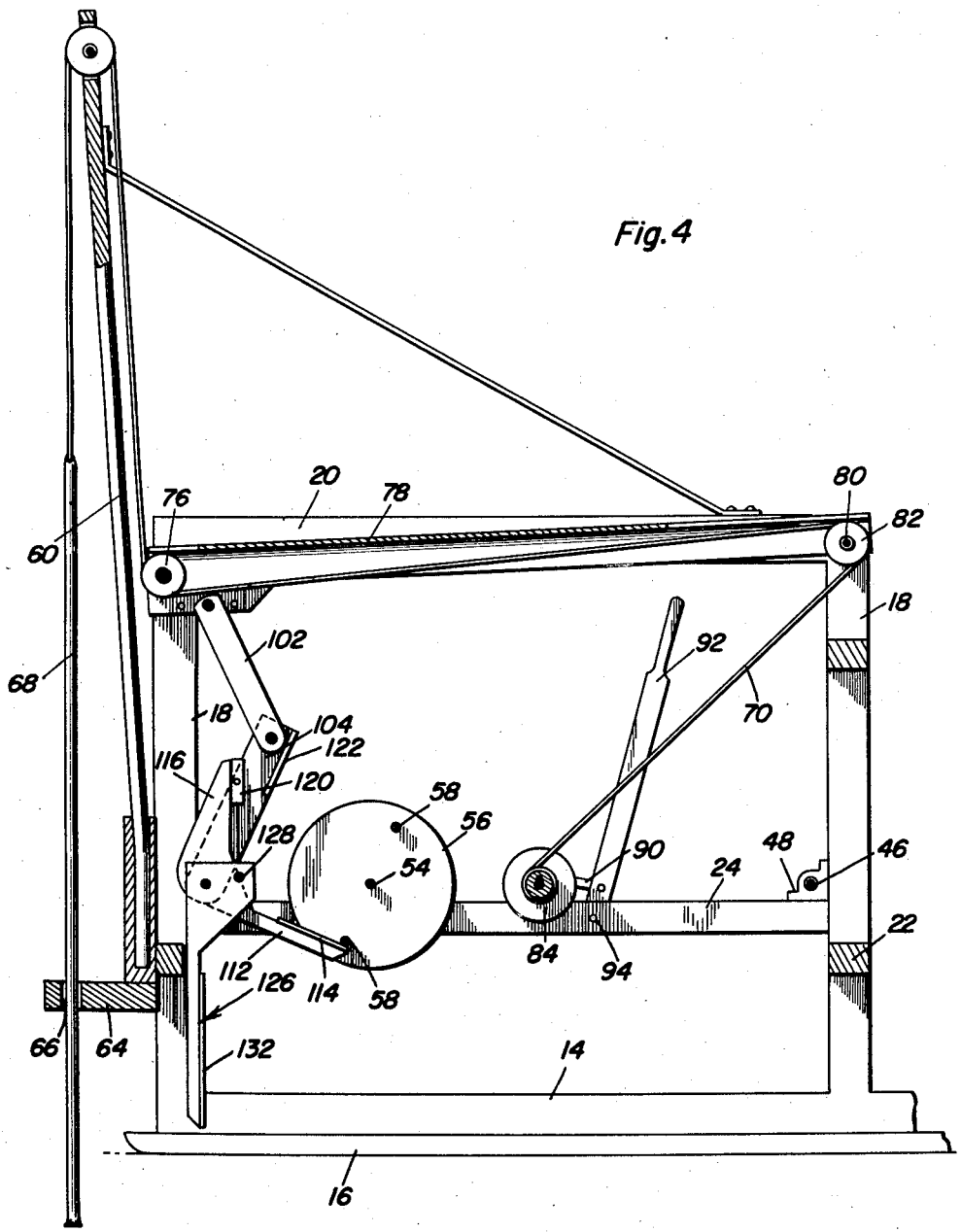
Figure 4 is a sectional view similar to Figure 3 but illustrating the drilling tool, lifting mechanism in lifting position.

The drill beam 78 is provided with a pair of depending flanges 96 having a series of apertures 98 therein for receiving a pin 100 which extends through an upper pitman 102. The upper pitman 102 is connected to a lower pitman 104 by a pivot pin 106. The lower pitman 104 is supported from the longitudinal frame members 24 by transverse pivot pin 108 extending through lugs on the frame members 24. Also mounted on the transverse pin 108 is a drill lever generally designated by numeral 110 which is substantially L-shaped in configuration and including a leg 112 having a plate 114 on the upper surface thereof and a leg 116 having an inclined surface 118 for engagement with an adjustment plate 120 mounted on the lower pitman 104. The lower pitman 104 also is provided with a stop flange 122 for limiting movement of the pitmans in one direction for retaining them in vertical position when they return from an operative position caused by rotation of the plate 56. The plate 114 on the leg 112 is disposed in the path of movement of the pin 58. Thus, from the condition illustrated in Figure 3 and assuming counterclockwise movement of the plates 56, the leg 112 will be pivoted downwardly and moving the pitmans 102 and 104 to the condition illustrated in Figure 4 at which time the pin 58 will be disengaged from the plate 114 whereupon gravity will return the pitmans to the straight condition and also return the drilling lever 110 to a normal condition whereby the beam 78 will be oscillated twice for each revolution of the shaft 54 with disengagement of the pin 58 from the plate 114 providing free movement of the beam 78 upwardly to a normal condition.

With the construction previously described and with the reduction or speed variation mechanism as described, the strokes per minute of the drill 68 may be increased due to the disengagement of the driving pins 58 from the plate 114 thus permitting the quick return or quick descent of the drill tool 68. Thus, the drill tool 68 is lifted from bottom center to top center depending upon the speed of the drive motor and reduction gear mechanism whereas the drill tool 68 moves from top center to bottom center without any control from the electric motor or driving motor thus providing a quick return mechanism thus enabling the pins 58 to effectively raise the drilling tool twice for each revolution of the plates 56.

In some instances, it is desirable to retard reciprocation of the drilling tool such as when fishing for tools. Also, it is desirable to render the reciprocating apparatus inoperative at certain times such as when hoisting the tools or when bailing the well. In order to render the mechanism inoperative, it is only necessary to pivot the drilling lever 110 upwardly to an inoperative position about the pivot pin 108. In other words, it is only necessary to move the leg 112 upwardly to a substantial vertical position so that it is completely out of the path of movement of the pins 58.

In order to provide a slow reciprocation, the drilling lever 110 is pivoted upwardly to an out-of-the-way position and a drill lever 126 is pivoted upwardly about the transverse pin 108 into perpendicular relation to the lower pitman and is secured in this position by a fastening member extending through aligned apertures 128 and 130 in the drilling lever 126 and the lower pitman 104 respectively. The drilling lever 126 includes an elongated plate 132 similar to the plate 114. The elongated plate 132 is of sufficient length to extend completely across the diameter of the plates 56 whereby both of the pins 58 may engage the top surface of the plate 132 at the same time. The extent of the plate 132 is shown in dotted line in Figure 3. With the plate 132 in engagement with the pins 58, the plate 132 will be swung downwardly twice for each revolution of the plates 56 but instead of the pins 58 sliding off the end of the plate 132 as happened in connection with plate 114, the pin will not move off the end of plate 132 wherein the tool will reciprocate in an up and down movement under the control or in response to the speed of the shaft 54 thus, with the lever 126 rendered operative, the drilling tool is lifted by the motor from the bottom center to the top center and then lowered by the motor from the top center to the bottom center which provides a slower rate of strokes for enabling the use of the present invention when fishing tools or bailer or anything that may be lost in the well.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination with a drilling machine frame, a vertically movable drilling tool, a pulley supported cable in said frame suspending said tool and flexible downwardly to raise said tool, and means for flexing said cable including a downwardly swingable beam pivoted on said frame, of means for swinging said beam comprising a pair of links terminally pivoted to said frame and beam respectively, and having an elbow joint connection to each other for swinging on their pivots and joint each in one direction only into angular position with respect to each other to swing said beam downwardly, a lever pivoted on the frame for swinging in opposite directions respectively, and engageable with one link intermediate the ends of the link to pivot said one link and break said joint in response to swinging of the lever in one direction, said lever having an operating leg operative to swing said lever in said one direction, and power operated means on said frame intermittently engaging and operating said operating leg.

2. The combination of claim 1, said lever being disengageable from said one link and swingable when disengaged in the opposite direction into an idle position.

3. The combination of claim 1, said lever being pivoted on the pivot of one of said links.

4. The combination of claim 1, said lever being L-shaped to provide said operating leg and another leg thereon engageable with said one link.

References Cited in the file of this patent

UNITED STATES PATENTS

| | | |
|---|---|---|
| 420,004 | Bowers et al. | Jan. 21, 1890 |
| 479,059 | Davis | July 19, 1892 |
| 1,100,086 | Miller | June 16, 1914 |
| 2,815,929 | Andreatta | Dec. 10, 1957 |